July 7, 1970    F. PAPRITZ    3,519,338
OPHTHALMOLOGICAL APPARATUS WITH A SLIT ILLUMINATION FOR
TAKING PHOTOGRAPHIC VIEWS OF THE EYE
Filed Dec. 7, 1966

INVENTOR
Franz Papritz
BY

United States Patent Office 3,519,338
Patented July 7, 1970

3,519,338
OPHTHALMOLOGICAL APPARATUS WITH A SLIT ILLUMINATION FOR TAKING PHOTOGRAPHIC VIEWS OF THE EYE
Franz Papritz, Niederscherli, Switzerland, assignor to Haag-Streit A.G., Liebefeld-Berne, Switzerland
Filed Dec. 7, 1966, Ser. No. 599,851
Claims priority, application Switzerland, Dec. 15, 1965, 17,305/65
Int. Cl. A61b 3/14, 3/10; G03b 9/70
U.S. Cl. 351—7                                   7 Claims

ABSTRACT OF THE DISCLOSURE

An ophthalmological apparatus, particularly for photographic recording of cornea profiles, comprising a flashlight source located between a slit diaphragm and the condenser of another light source for continuous illumination.

---

This invention relates to an ophthalmological apparatus having a light source, a condenser and a slit diaphragm for continuous illumination of the eye and a flashlight source for instantaneous illumination of the eye by means of a flat light beam. Apparatus of this kind are known, whereby the continuous illumination serves for adjusting the apparatus and for direct observation of the eye, whereas the flashlight source serves for photographic recording of the eye or parts thereof after preliminary adjustment of the apparatus.

In prior apparatus of this type both light sources are located at the side of the condenser opposite to the slit diaphragm. The construction of these prior devices is based on the obvious idea that the additional flashlight source should be disposed at the locus of the continuous light source. However, this solution has many disadvantages. An additional system of lenses absorbing a substantial portion of the available light must be used for forming a picture of the flashlight source in the slit diaphragm. The yield of the flashlight source is unfavourable because only a small part of the available flashlight is projected into the slit diaphragm.

This invention is based on the discovery that a simpler arrangement with better light yield is feasible. The apparatus according to this invention is broadly characterized in that the flashlight source is disposed between the condenser and the slit diaphragm. The said additional system of lenses for forming a picture of the flashlight source in the slit diaphragm may be omitted and a higher portion of the available flashlight may be utilized. A particularly favourable yield is obtained if a flash tube is arranged parallel to the slit diaphragm and if a picture of the slit diaphragm on a reduced scale is formed in the eye. Under these circumstances a relatively high portion of the light produced by the flash tube disposed near the slit diaphragm will pass through the relatively large slit and will produce an illumination of high intensity in the eye.

Figure 1:
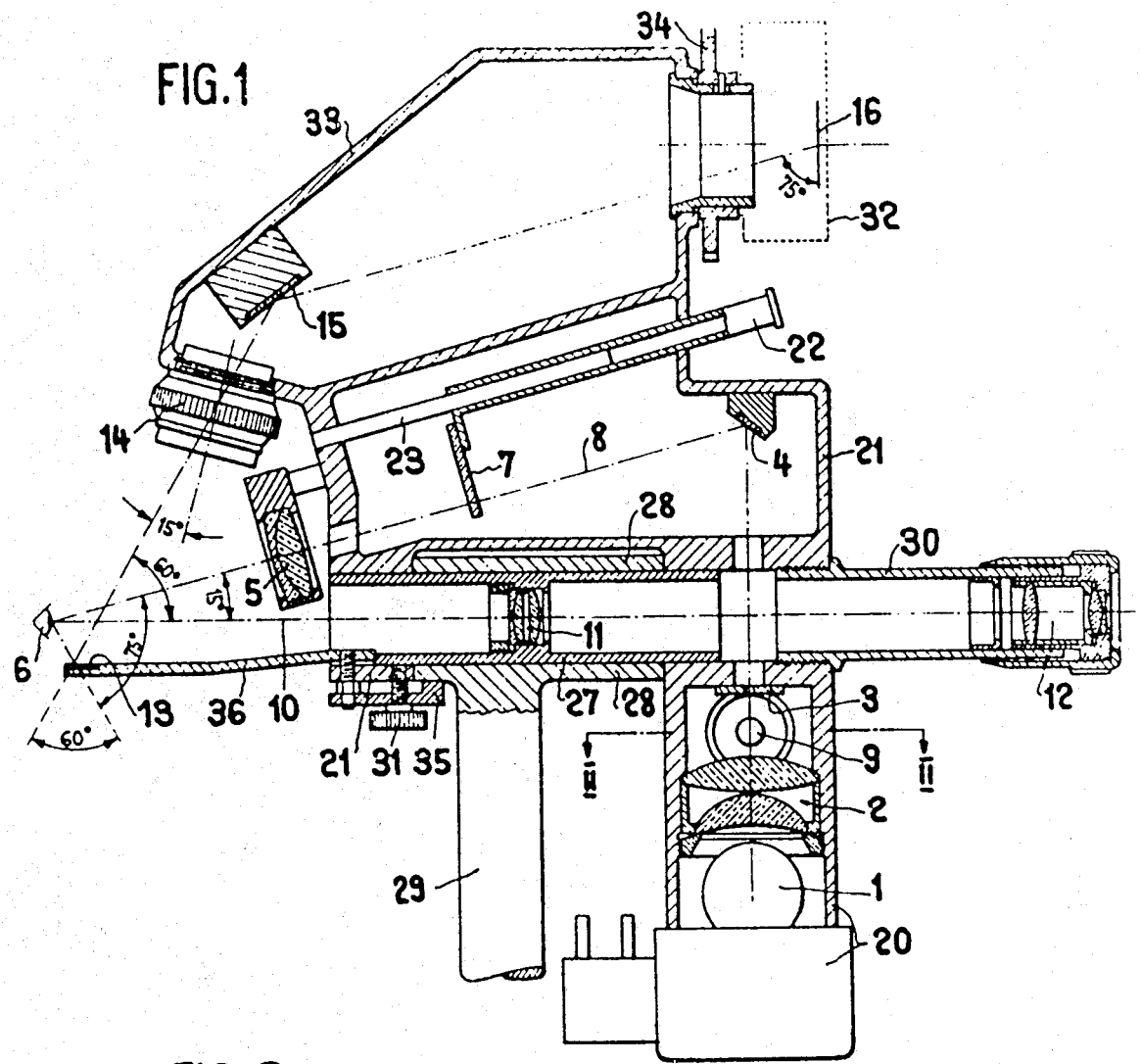
Figure 2:
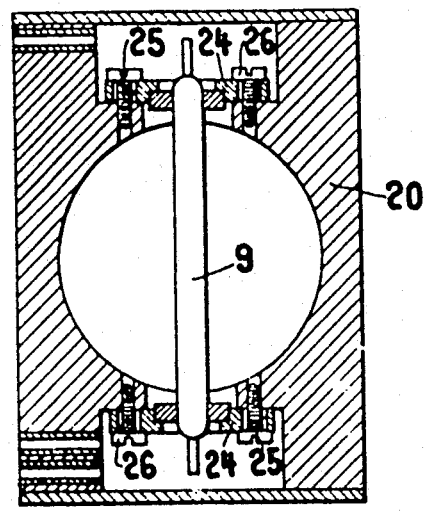

One embodiment of this invention is illustrated by way of example in the attached drawing wherein FIG. 1 is a sectional view of the apparatus and FIG. 2 is a section along line II—II in FIG. 1 on a larger scale.

The apparatus has an incandescent lamp 1, a condenser 2, a slit diaphragm 3, a plane mirror 4 and an illumination lens 5, these parts serving for continuously projecting a flat light beam into an eye 6. The optical elements are accommodated in a casing having a portion 20 receiving the lamp 1, condenser 2 and slit diaphragm 3. A second portion 21 of the casing serves for accommodation of the mirror 4 and of a fixation mark 7 displaceable along the optical trace of the illuminating beam. The mark 7 is fixed on a tube 22 extending through an opening of casing portion 21 and guided on a bar 23.

A flash tube 9 is disposed between the condenser 2 and the slit diaphragm 3 in a position parallel to the longitudinal extension of the slit. A flat beam of flashlight may be projected into the eye 6 from flash tube 9 through diaphragm 3, mirror 4 and lens 5. As shown in FIG. 2 the flash tube 9 is supported in discs 24 screwed to the structure of casing portion 20. The diameter of the holes 25 of discs 24 exceeds the diameter of the fixing screws 26 so that adjustment of the discs and of the flash tube supported therein in a direction transversal to the longitudinal extension of the flash tube and of the slit of the diaphragm 3 respectively is possible when screws 26 are loosened. It is thus possible to adjust the flash tube into a position optically symmetrical to the slit of the diaphragm and to the optical axis of the condenser and of the lamp 1, so that the trace of rays of the lamp illumination is not disturbed by any asymmetry of the flash tube.

The axis of the incident light beam includes an angle of 15° with the optical axis 10 of an optical observing system having an objective 11 and an ocular 12. The optical axis of this system is horizontal and passes through the eye 6.

The objective 11 of the observing system is accommodated in a tubular carrier 27 rotatably mounted in a sleeve 28 of a support 29. The support 29 is fixed on a table not shown in the drawing. The ocular of the observing system is accommodated in a tube 30 fixed in the casing. The casing portions 20 and 21 are fixed on the tubular carrier 27 and may be locked in determined angular positions by means of a bracket 35 engageable against the one rim portion of sleeve 28 by means of screw 31. When screw 31 is loosened for disengaging bracket 35 from sleeve 28, the casing portions 20 and 21 may be manually rotated, together with tubular carrier 27, by seizing one of parts 20 or 21. Parts 20, 21 and 27 may be locked again in any desired angular position by means of screw 31 and bracket 35.

A support 36 is fixed at the fore end of carrier 27 in a bore of casing portion 21.

A plane mirror 13 fixed on support 36 is disposed in front of the eye and at the side of the observing axis 10. The illuminated portion of the cornea of the eye 6 may be photographically recorded on the film 16 of a schematically illustrated camera 32 fixed in an opening of a casing portion 33 by means of a clamping ring 34. The trace of rays into the camera passes from the cornea over mirror 13, an objective 14 and another mirror 15. As shown in the drawing the trace of the rays between the eye and the mirror 13 includes an angle of 75° with the axis 8 of the incident beam. Further, the objective 14 includes an angle of 15° with the trace of rays so that the axis of the objective 14 is optically perpendicular to the direction of incidence of the light beam. The plane mirror 15 is so arranged that the film 16 which is in a plane perpendicular to the axis of observation 10 for practical reasons is optically parallel to the axis 8 of the incident light beam. The above facts may easily be verified by drawing the virtual positions of parts 14, 15 and 16 at the opposite side of the plane of mirror 13. The use of two mirrors 13 and 15 brings the further advantage that no reversal of the picture occurs.

Operation of the apparatus is as follows:

First the lamp 1 is switched on and the apparatus is so adjusted that the observation axis 10 is centered relatively to the eye 6. Afterwards the patient is instructed to look at the fixation mark 7, so that the eye is turned into the axis of incidence 8 of the light beam. In this case the flat light beam centrally enters into the eye and illuminates a great circle of the cornea. As soon as the continuously observed illumination of the eye is centered as required the shutter of the camera and the flash illumination are simultaneously actuated in a manner well known in the art, whereby a sharp image of one central section of the cornea is obtained. The screw 31 is now loosened and the apparatus is rotated round its axis 10 into another angular position and is locked in the new position by means of screw 31 and bracket 35, whereafter another picture of a cornea section is made. In this manner a number of different sections or profiles of the cornea may be photographed and the exact form of the cornea may be determined from the series of pictures. The grinding of the contact surface of contact lenses may be based on the pictures thus obtained. Since the axis of the objective 14 is perpendicular to the direction of incidence of the light and the film 16 is parallel to this direction of incidence, no distortion or shortening of the pictures of the cornea profile occurs. Due to the inclination by 15° of the incident light beam relatively to the direction of observation a more favourable disposition of the trace of rays and of the optical elements between the eye and the camera is obtained. Under all circumstances the mirror 13 may sufficiently be approached to the face of the patient for forming a picture of the cornea without partial obstruction of the trace of rays.

As already mentioned, a picture on a reduced scale of the slit diaphragm 3 is produced in the eye, this allowing the use of a relatively long slit and of a correspondingly long flash tube so that a flash illumination of high intensity is obtained with simple and inexpensive means. On the other hand, the trace of rays of the continuous illumination by means of the lamp 1 is hardly influenced by the flash tube 9 and this tube may always be adjusted into a position for which the symmetry of the trace of rays of the continuous illumination is not disturbed.

A similar flash illumination may also be used with other ophthalmological apparatus, particularly with slit lamps where accommodation of the flash tube between the condenser and the slit diaphragm is easily possible.

What is claimed is:

1. In an ophthalmological apparatus of the type including an optical system for observation of the eye, a photographic camera for taking pictures of the eye, a light source, a condenser for said light source and a slit diaphragm all in optical alignment for continuous illumination of the eye with a flat light beam from said light source through said slit diaphragm during observation of the eye, the improvement wherein a flashlight source is included positioned between said condenser and said slit diaphragm, the flashlight source, elongated in shape, is positioned parallel to the slit diaphragm and immediately adjacent thereto so that the light from said flashlight source is passed directly through said slit diaphragm to said eye during the taking of a picture by said camera whereby at least approximately the same field is illuminated by said flash light as is illuminated by said light source.

2. An apparatus according to claim 1, in which an illuminating lens is positioned between said slit diaphragm and the locus of the eye for producing an image of the slit diaphragm on a reduced scale in the eye.

3. An apparatus according to claim 1, in which a support for the flash tube is mounted between said condenser and said slit diaphragm, said support being adjustable in a direction transverse to the longitudinal extension of the slit for adjustment of said flash tube into symmetrical position relative to said slit diaphragm and the axis of said condenser and light source.

4. An apparatus according to claim 1 for photographic recording of corena profiles, in which said camera includes an objective and a film, the plane of the film being optically parallel to and the axis of the objective being optically perpendicular to the axis of the light beam projected into the eye.

5. An apparatus according to claim 4, in which is included a casing for accommodation of the camera, light sources, condenser and slit diaphragm, and bearing means allowing rotation of said casing around the observation axis and means for locking said casing in predetermined angular position.

6. An apparatus according to claim 4, in which said optical system for observation of the eye is accommodated in a horizontal tubular carrier, the axis of the light beam falling into the eye being inclined relatively to the axis of said tubular carrier, the trace of the rays between the eye and the camera including an acute angle with the axis of the incident light beam directed into the eye.

7. An apparatus according to claim 6, in which there is included a plane mirror positioned parallel to the axis of said tubular carrier and extending from the tubular carrier into the trace of rays between the eye and objective of the camera.

References Cited

UNITED STATES PATENTS

| | | | |
|---|---|---|---|
| 1,721,208 | 7/1929 | Currier et al. | 351—7 X |
| 2,478,545 | 8/1949 | Pearce | 351—7 X |
| 2,542,311 | 2/1951 | Carlson. | |
| 2,893,289 | 7/1959 | Edgerton | 350—87 |
| 2,959,097 | 11/1960 | Möllring | 350—87 |
| 3,217,622 | 11/1965 | Kiyono | 351—7 X |

FOREIGN PATENTS 1,399,499   4/1965   France.

DAVID SCHONBERG, Primary Examiner

P. A. SACHER, Assistant Examiner

U.S. Cl. X.R.

351—14, 16; 95—11, 11.5